(12) United States Patent
Ebert (10) Patent No.: US 11,317,598 B2
(45) Date of Patent: May 3, 2022

(54) LITTER BOX COVER WITH COMBINED CANOPY AND CHUTE

(71) Applicant: Omega Paw Inc., St. Marys (CA)

(72) Inventor: Michael Adrian Ebert, St. Marys (CA)

(73) Assignee: Omega Paw Inc., St. Marys (CA)

( * ) Notice: Subject to any disclaimer, the term of this patent is extended or adjusted under 35 U.S.C. 154(b) by 142 days.

(21) Appl. No.: 16/914,855

(22) Filed: Jun. 29, 2020

(65) Prior Publication Data
US 2021/0400906 A1  Dec. 30, 2021

(51) Int. Cl.
*A01K 1/01*  (2006.01)

(52) U.S. Cl.
CPC ..................... *A01K 1/011* (2013.01)

(58) Field of Classification Search
CPC ..... A01K 1/0107; A01K 1/0114; A01K 1/011
USPC .......... 119/165, 168, 161, 479, 166
See application file for complete search history.

(56) References Cited

U.S. PATENT DOCUMENTS

| | | | | |
|---|---|---|---|---|
| 4,846,104 A | * | 7/1989 | Pierson, Jr. .......... | A01K 1/0114 119/166 |
| 5,058,528 A | | 10/1991 | Counsellor et al. | |
| 5,178,099 A | * | 1/1993 | Lapps .................. | A01K 1/0114 119/161 |
| 5,226,388 A | * | 7/1993 | McDaniel ............ | A01K 1/0114 119/166 |
| 5,507,252 A | | 4/1996 | Ebert | |
| 5,572,950 A | * | 11/1996 | O'Rourke ............ | A01K 1/0107 119/165 |
| 5,623,892 A | * | 4/1997 | O'Rourke ............ | A01K 1/0107 119/165 |
| 5,662,066 A | * | 9/1997 | Reitz .................... | A01K 1/0114 119/163 |
| D399,613 S | * | 10/1998 | O'Rourke .................... | D30/161 |
| 6,126,015 A | * | 10/2000 | Haymaker ........... | A01K 1/0114 119/166 |
| 6,439,161 B1 | | 8/2002 | Clemmons | |
| 6,742,476 B2 | * | 6/2004 | Sage, Jr. ............... | A01K 1/0107 119/166 |
| 6,892,670 B2 | * | 5/2005 | Northrop ............. | A01K 1/0114 119/165 |
| 6,997,137 B1 | | 2/2006 | Ricke | |

(Continued)

FOREIGN PATENT DOCUMENTS

| | | | |
|---|---|---|---|
| FR | 2561066 | 9/1985 | |
| GB | 2191377 A | * 12/1987 | ........... A01K 1/0107 |

(Continued)

*Primary Examiner* — Yvonne R Abbott-Lewis
(74) *Attorney, Agent, or Firm* — Gowling WLG (Canada) LLP (57) ABSTRACT

A litter box cover comprises an enclosure adapted to engage and cover a litter pan. The enclosure defines an interior volume adapted to accommodate *felis catus* (housecat) defecation, and has a feline transit doorway opening into the interior volume and which is adapted to accommodate *felis catus* ingress into and egress from the interior volume. A hood is movably coupled to the enclosure in registration with the doorway so as to be movable between a canopy position and a chute position. In the canopy position the hood extends outwardly from the enclosure to form a canopy over the doorway, and in the chute position the hood forms a guide ramp for guiding particulate material such as kitty litter through the doorway into the interior volume.

12 Claims, 6 Drawing Sheets

(56) References Cited

U.S. PATENT DOCUMENTS

| | | | |
|---|---|---|---|
| 7,017,519 B1 * | 3/2006 | Deasy | A01K 1/011 |
| | | | 119/166 |
| D601,313 S * | 9/2009 | Kim | D30/161 |
| 7,832,357 B2 * | 11/2010 | Matsuo | A01K 1/0107 |
| | | | 119/165 |
| 7,856,945 B2 * | 12/2010 | Matsuo | A01K 1/0107 |
| | | | 119/166 |
| 7,913,649 B2 * | 3/2011 | LeCavalier | A01K 1/0107 |
| | | | 119/165 |
| 9,107,383 B2 * | 8/2015 | Khalili | A01K 1/0114 |
| 10,098,315 B2 * | 10/2018 | Couto | A01K 1/0114 |
| 10,517,263 B1 * | 12/2019 | Perez | A01K 1/0157 |
| 2006/0196438 A1 | 9/2006 | Caputa et al. | |
| 2009/0000560 A1 * | 1/2009 | Matsuo | A01K 1/0107 |
| | | | 119/168 |
| 2011/0088629 A1 | 4/2011 | Lathim | |

FOREIGN PATENT DOCUMENTS

| | | | |
|---|---|---|---|
| JP | 3214437 U | 1/2018 | |
| WO | WO-2020219849 A1 * | 10/2020 | A01K 1/011 |

\* cited by examiner

LITTER BOX COVER WITH COMBINED CANOPY AND CHUTE

TECHNICAL FIELD

The present disclosure relates to litter boxes, and in particular to covered litter boxes.

BACKGROUND

The species *felis catus*, or common housecat, has been the companion of humanity since at least the age of the ancient Egyptian civilization. In more modern times, the housecat, as its name implies, frequently resides in human homes, where it forms part of the family. Like any other mammal, the housecat has certain excretory needs. These are typically accommodated by the use of a litter box, which typically takes the form of a pan in which a specialized granular substance, known generally as "kitty litter", is disposed. The solid waste can be sifted from the kitty litter and disposed of in a suitable manner.

As can be expected, the material deposited by the cat in the litter pan does not typically emit a pleasing smell, and it is common to provide a cover for the litter pan to limit malodorous emanations and also shield the excretions from view. These covers will usually include a doorway through which the housecat can pass. While such covers present an improvement over an open litter pan, they must still be removed in order to remove waste and refill the kitty litter.

More recently, so-called "self-cleaning" litter boxes have become available, such as the Omega Paw Roll 'n Clean Litter Box. With this design, a litter pan is covered by a litter box cover in the form of an enclosure secured to the litter pan. The complete litter box has a curved side and flat base so that the assembly can be rolled onto its side, and then back onto its base. A grate or grill extends vertically (when the litter box is upright) within the litter box, substantially perpendicular to the base, with a lower end at or adjacent the base and an upper end that terminates in a shelf that supports a waste removal tray. The waste removal tray is adapted to be selectively slid into and out of the enclosure, with suitable retaining elements provided in the enclosure to hold the waste removal tray in position on the shelf during rolling. Upon rolling of the litter box onto its side, the granular kitty litter begins to pass through the grate or grill while the solid waste and urine-saturated clumps are trapped on the surface of the grate or grill, being too large to pass therethrough. On further rolling, the enclosure is turned upside down or nearly so such that the top of the enclosure is flush or nearly flush with the ground. Consequently, the urine-saturated clumps and solid waste fall from the grate or grill to the inner surface of the top side of the enclosure and the kitty litter passes through the grate or grill so as to be cleaned kitty litter. Rolling the litter box back in the other direction causes the solid waste and urine-saturated clumps to slide into the waste removal tray and the cleaned kitty litter slides back through the grate or grill into the litter pan. The waste removal tray can then be withdrawn to dispose of the waste.

While a self-cleaning litter box of this type represents a substantial improvement over the prior art, it is still necessary to remove the enclosure to add more kitty litter, or else deposit the additional kitty litter through the doorway, which is somewhat awkward and risks spillage.

SUMMARY

In one aspect, a litter box cover comprises an enclosure adapted to engage and cover a litter pan. The enclosure defines an interior volume adapted to accommodate *felis catus* defecation, and has a feline transit doorway opening into the interior volume and which is adapted to accommodate *felis catus* ingress into and egress from the interior volume. A hood is movably coupled to the enclosure in registration with the doorway so as to be movable between a canopy position, in which the hood extends outwardly from the enclosure to form a canopy over the doorway, and a chute position in which the hood forms a guide ramp for guiding particulate material through the doorway into the interior volume.

In some embodiments, the litter box cover may be part of a litter box which comprises the litter box cover and a litter pan wherein the litter box cover is engaged with and covers the litter pan to form the litter box. In some embodiments, the litter box may be a self-cleaning litter box. The enclosure may include a receptacle adapted to receive a waste removal tray for removing waste.

The hood may include sidewalls, and may be curved such that when the hood is in the canopy position, the canopy formed by the hood is generally convex and when the hood is in the chute position, the guide ramp formed by the hood is generally concave.

In some embodiments, the enclosure and the hood are each of monolithic construction. In some embodiments, the hood may be modular and releasably interengageable with the enclosure.

In some embodiments, the hood has a superior end and an inferior end, relative to the doorway, and when the hood is in the canopy position, the superior end overlies the enclosure whereas when the hood is in the chute position, the inferior end of the hood extends through the doorway into the interior volume whereby a chute discharge mouth is disposed within the interior volume, interiorly of the doorway. In some such embodiments, at least one hood retainer element is disposed on the hood adjacent the superior end of the hood and is adapted to engage a corresponding enclosure retaining element on the enclosure to selectively releasably retain the hood in the canopy position. Additionally, in some such embodiments, at least one laterally projecting stop is disposed on the hood adjacent the inferior end of the hood and is adapted to engage at least one corresponding jamb edge of the doorway to limit movement of the hood relative to the enclosure and thereby define the chute position. In some particular implementations of this embodiment, the hood includes sidewalls and the at least one laterally projecting stop comprises two opposed stops, each formed by one of the sidewalls.

In some embodiments, the hood is pivotably coupled to the enclosure.

BRIEF DESCRIPTION OF THE DRAWINGS

These and other features will become more apparent from the following description in which reference is made to the appended drawings wherein.

DETAILED DESCRIPTION

Figure 1:
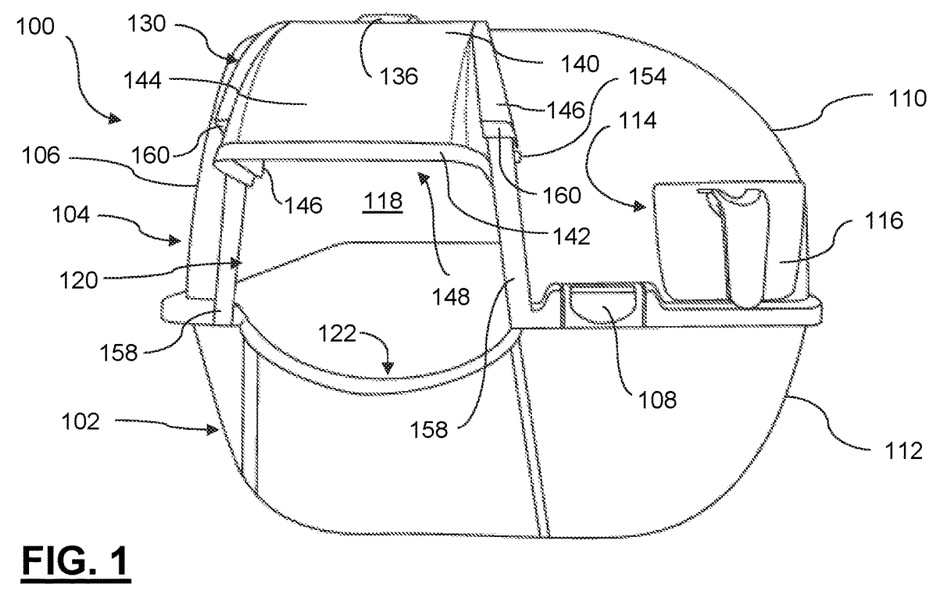
FIG. 1 is a front view of an illustrative litter box according to an aspect of the present disclosure.
Figure 1A:
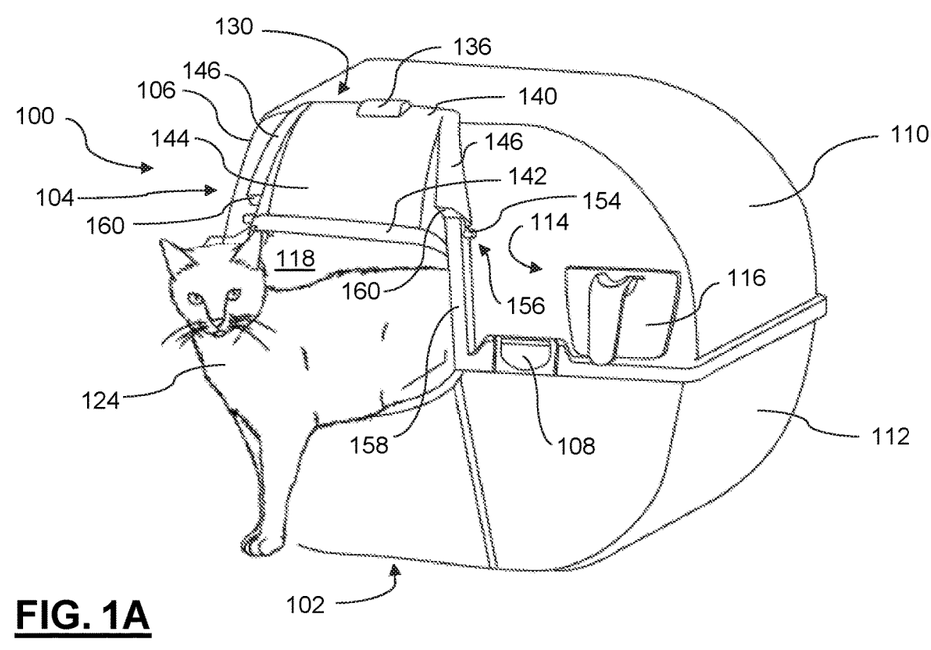
FIG. 1A is a front perspective view of the litter box of FIG. 1, showing a cat emerging therefrom.
Figure 2A:
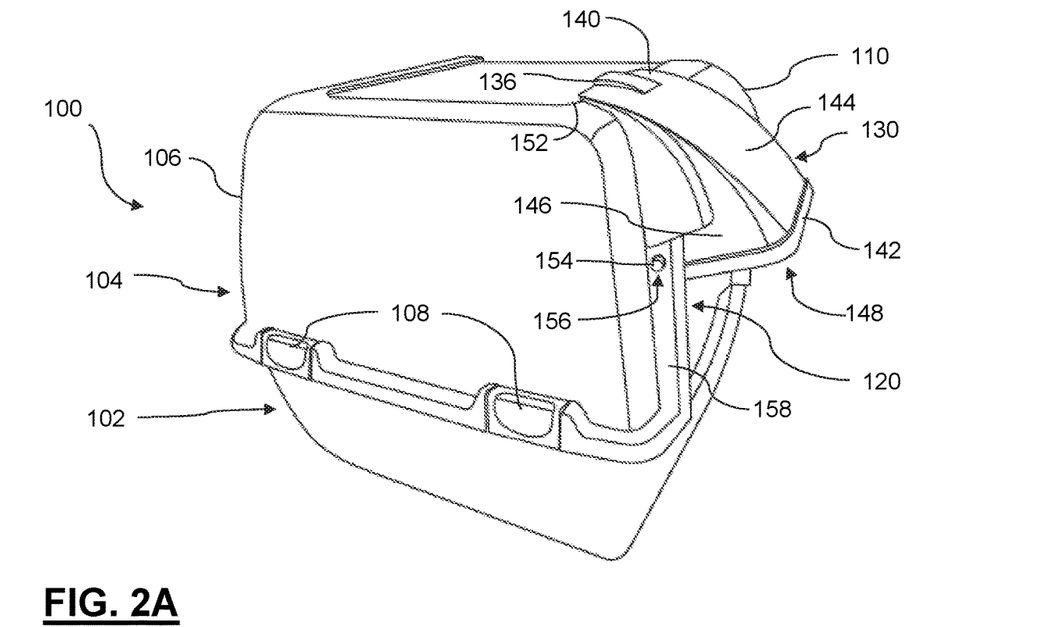
FIG. 2A is a side perspective view of the litter box of FIG. 1, showing a hood thereof in a canopy position.
Figure 2B:
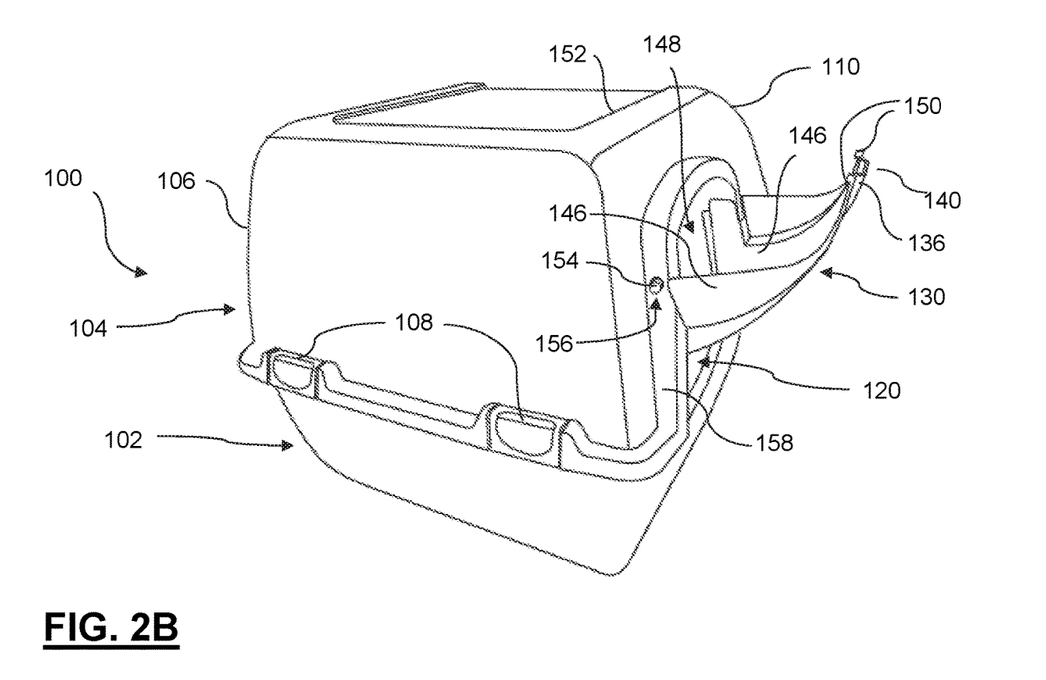
FIG. 2B is a side perspective view of the litter box of FIG. 1, showing the hood thereof in a chute position.
Figure 3A:
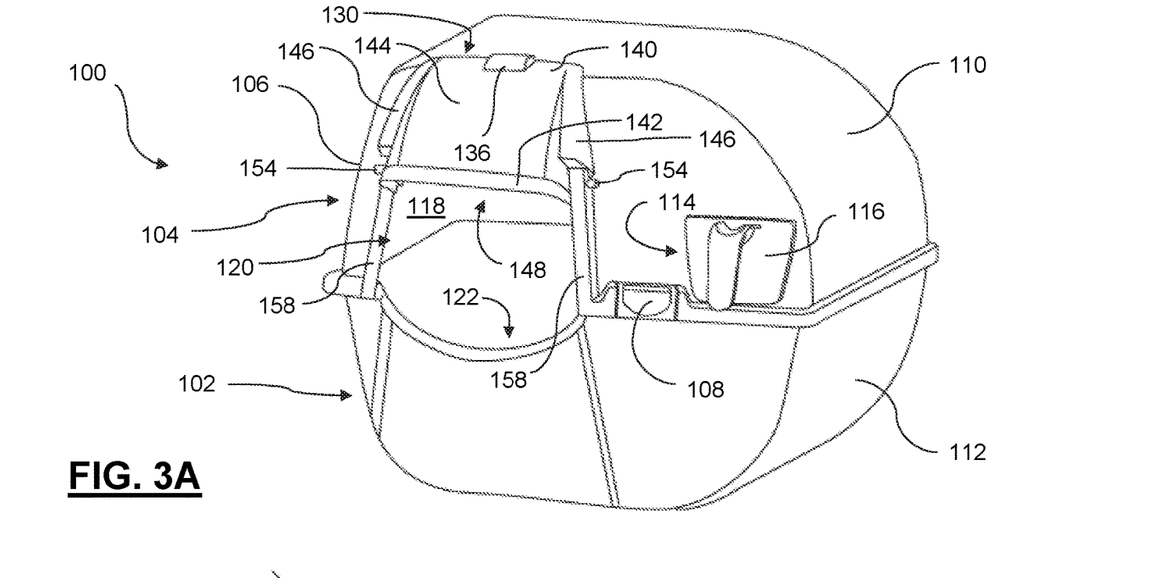
FIG. 3A is a front perspective view of the litter box of FIG. 1, showing the hood thereof in the canopy position.
Figure 3B:
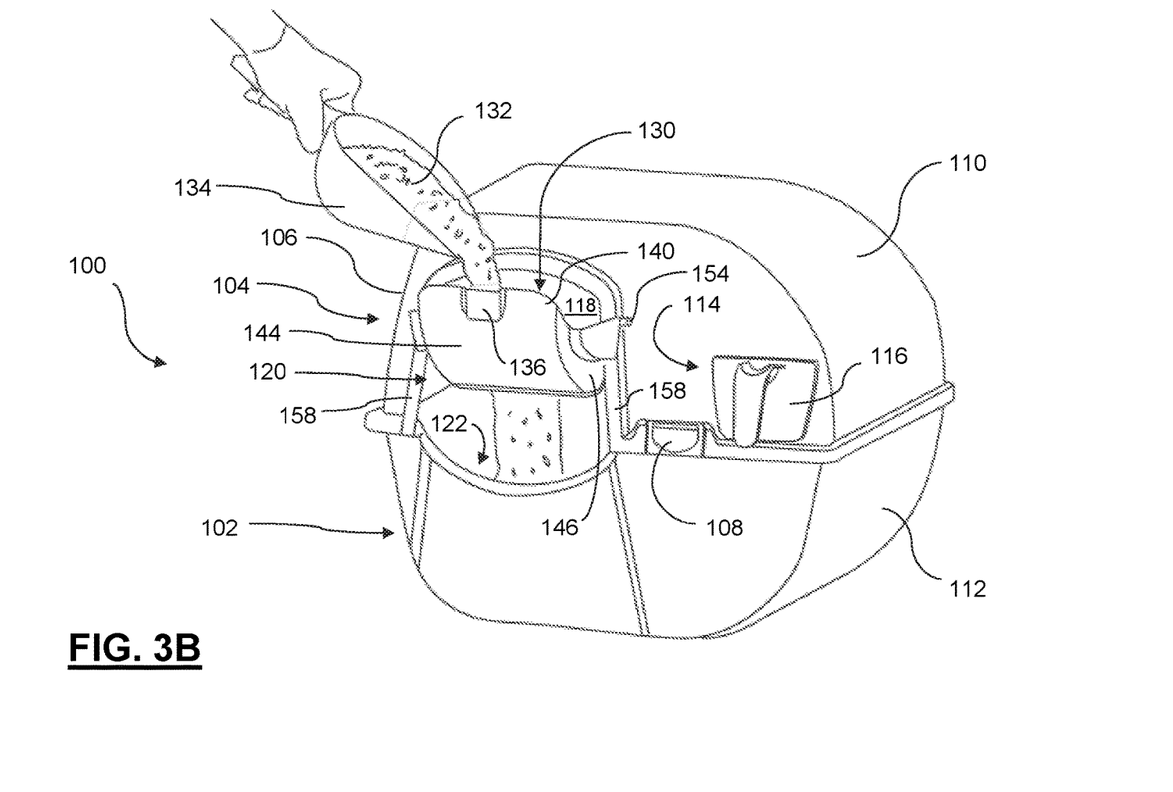
FIG. 3B is a front perspective view of the litter box of FIG. 1, showing the hood thereof in the chute position with kitty litter being deposited therein.

Reference is now made to FIGS. 1 and 1A, which show an illustrative litter box, indicated generally by reference 100, according to an aspect of the present disclosure. The litter box 100 comprises a litter pan 102 and a litter box cover 104. The litter box cover 104 comprises an enclosure 106 adapted to engage with and cover the litter pan 102 to form the litter box 100. For example, clips 108 or other suitable mechanisms may be used to secure the litter box cover 104 to the litter pan 102. In the illustrated embodiment, the litter box 100 is a self-cleaning litter box 100 of the same general design as the Omega Paw Roll 'n Clean Litter Box described above. As such, in the illustrated embodiment, the litter box cover 104 and litter pan 102 have respective convexly curved sidewalls 110, 112 so that the litter box 100 can be rolled onto its side, and the enclosure 106 includes a receptacle 114 adapted to receive a waste removal tray 116 by way of which the waste can be removed after rolling. A grate or grill (not shown) may also be provided in the litter box 100. This is merely one illustrative embodiment and is not intended to be limiting.

The enclosure 106 defines an interior volume 118 adapted to accommodate *felis catus* defecation, and has a feline transit doorway 120 opening into the interior volume 118. The feline transit doorway 120 is adapted to accommodate *felis catus* ingress into and egress from the interior volume 118. Optionally the litter pan 102 may be provided with a recess 122 in registration with the doorway 120 to enlarge the opening. FIG. 1A shows an exemplary cat 124 exiting the litter box 100. In the illustrated embodiment the exemplary cat 124 is a calico cat named "Avery"; the litter box 100 may be used with any suitable cat.

Figure 4A:
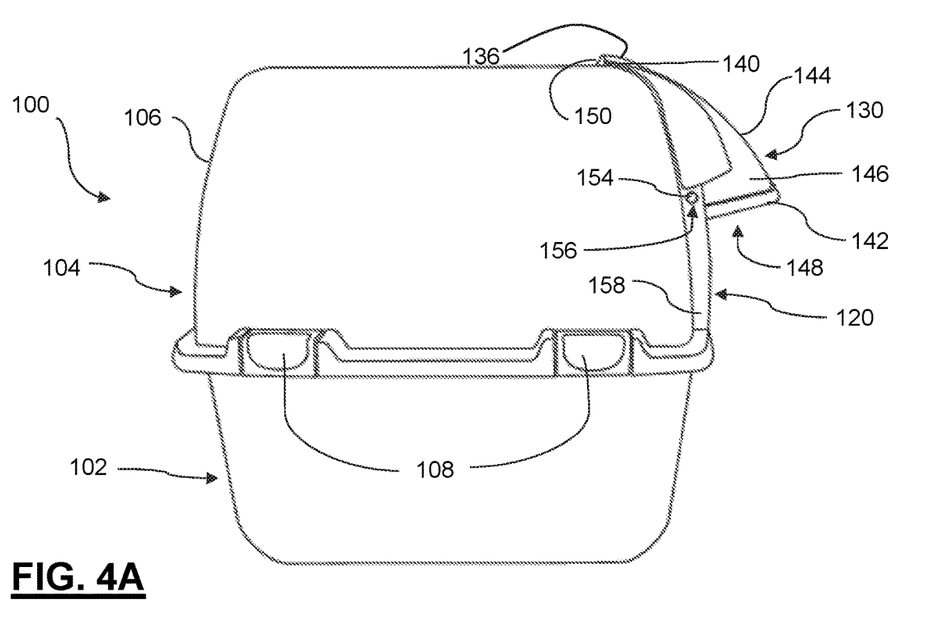
FIG. 4A is a side view of the litter box of FIG. 1, showing the hood thereof in the canopy position.
Figure 4B:
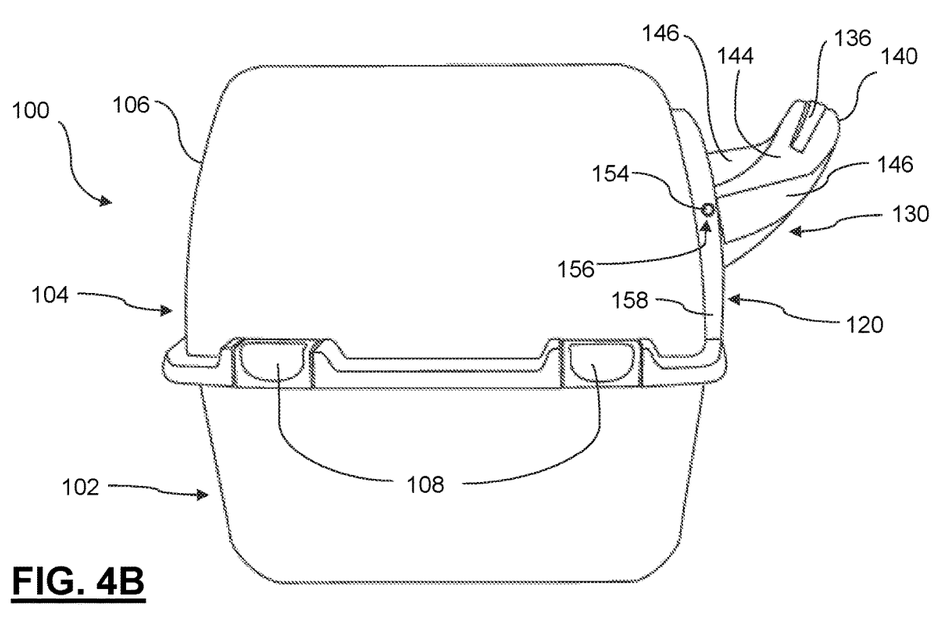
FIG. 4B is a side view of the litter box of FIG. 1, showing the hood thereof in the chute position.
Figure 5A:
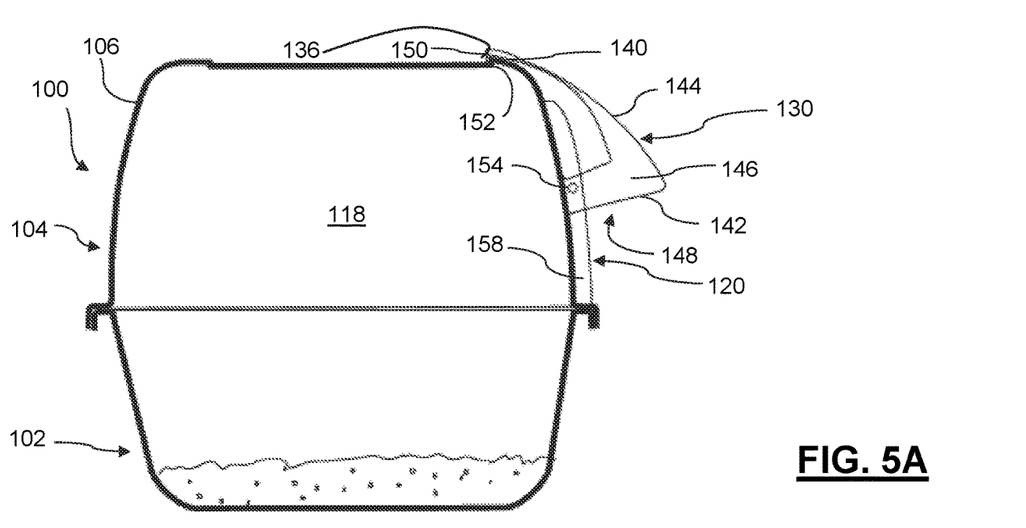
FIG. 5A is a side cross-sectional view of the litter box of FIG. 1, showing the hood thereof in the canopy position.
Figure 5B:
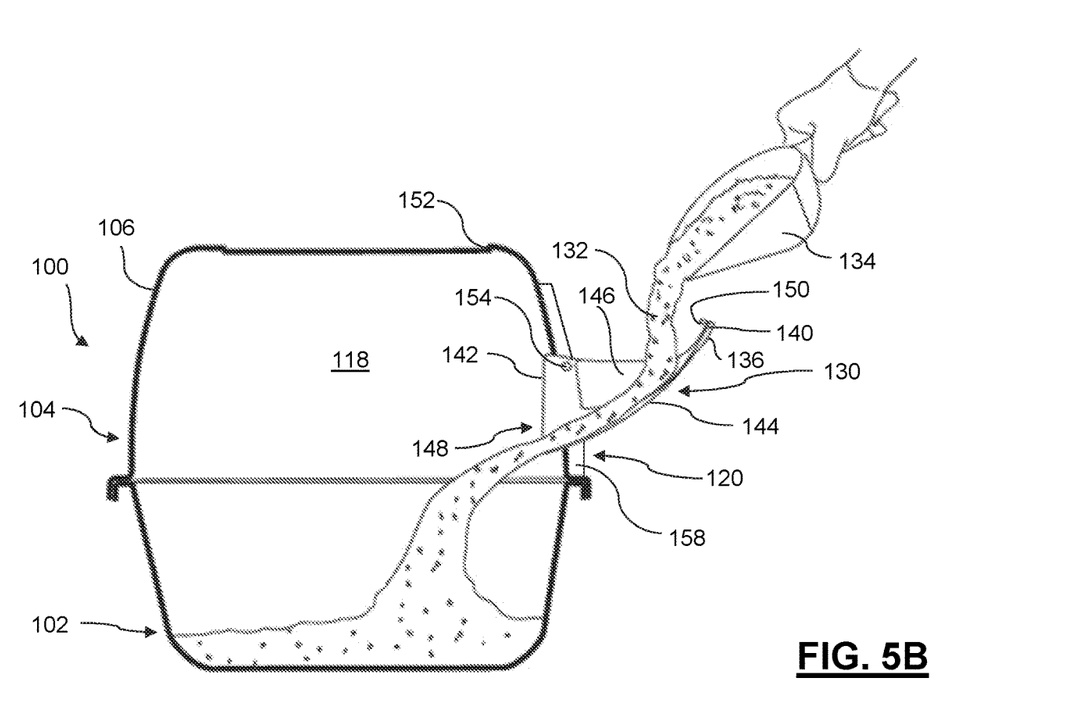
FIG. 5B is a side cross-sectional view of the litter box of FIG. 1, showing the hood thereof in the chute position with kitty litter being deposited therein.

Referring now to FIGS. 2A through 5B, a hood 130 is movably coupled to the enclosure 106 in registration with the doorway 120. In the illustrated embodiment the hood 130 is pivotably coupled to the enclosure 106 although other movable arrangements are also contemplated. The hood 130 is movable between a canopy position and a chute position. In the canopy position, as shown in FIGS. 2A, 3A, 4A and 5A, the hood 130 extends outwardly from the enclosure to form a canopy over the doorway 120. When the hood 130 forms a canopy over the doorway, it serves to obscure the view through the doorway from a standing position for a human adult, which may limit visibility of unsightly cat waste, and may also limit emanation of odors. In the chute position, as shown in FIGS. 2B, 3B, 4B and 5B, the hood 130 forms a guide ramp for guiding particulate material through the doorway 120 into the interior volume 118, which enables kitty litter 132 to easily be added to the litter pan 102 without needing to remove the litter box cover 104 and without needing to try to insert the refill scoop 134 (which is typically different from the waste removal tray 116) through the doorway 120. Addition of kitty litter 132 is shown in FIGS. 3B and 5B.

Figure 6:
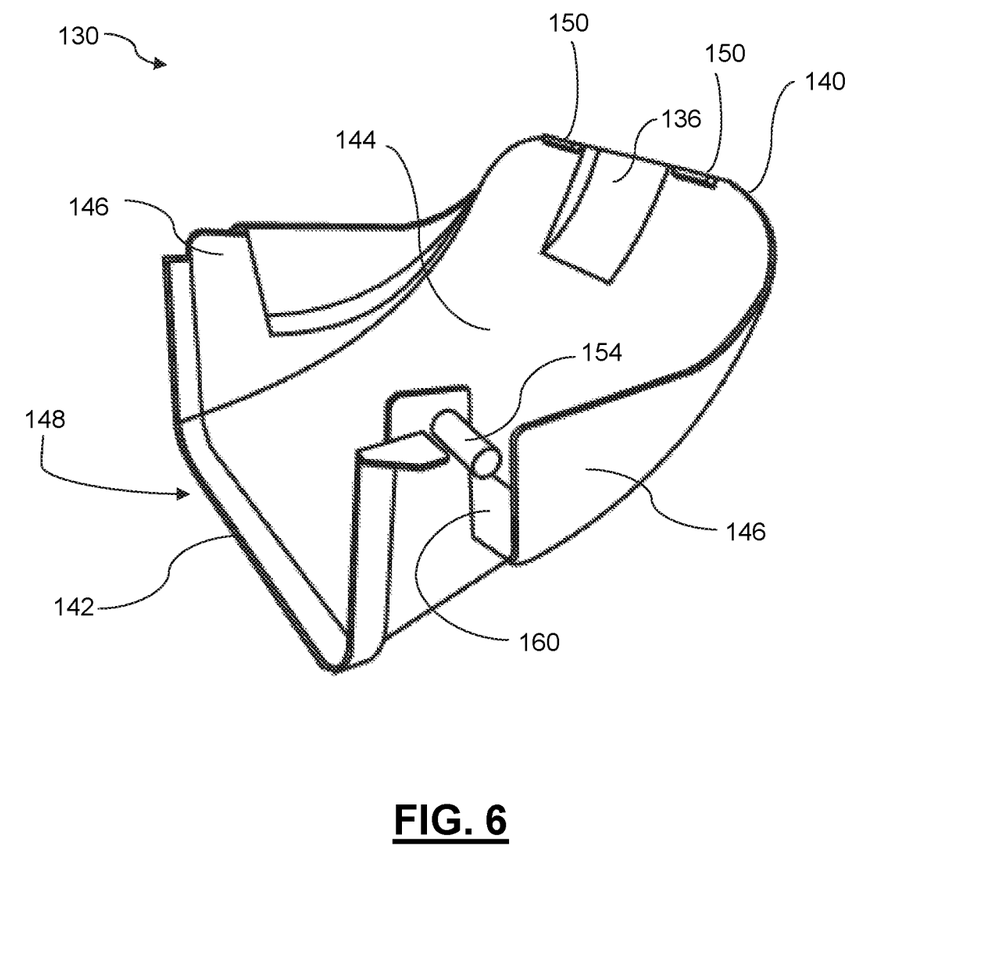
FIG. 6 is a perspective view of the hood of the litter box of FIG. 1, shown in isolation.

Referring now to FIG. 6, in one preferred embodiment the hood 130 has a superior end 140 and an inferior end 142, relative to mounting of the hood 130 in registration with the doorway 120. The hood 130 is curved between its superior end 140 and its inferior end 142, and comprises a curved ramp portion 144 and opposed sidewalls 146 extending alongside the ramp portion 144 from adjacent the superior end 140 to the inferior end 142. A chute discharge mouth 148 is formed at the inferior end 142 by the ramp portion 144 and the sidewalls 146. The sidewalls 146 generally taper from the inferior end 142 toward the superior end 140. As best seen in FIGS. 5A and 5B, the curvature of the hood 130 is such that when the hood 130 is in the canopy position, the canopy formed by the hood 130 is generally convex (FIG. 5A) and when the hood 130 is in the chute position, the guide ramp formed by the hood 130 is generally concave (FIG. 5B).

Continuing to refer to FIGS. 5A and 5B, when the hood 130 is in the canopy position, the superior end 140 of the hood 130 overlies the enclosure 106, and when the hood 130 is in the chute position, the inferior end 142 of the hood 130 extends through the doorway 120 into the interior volume 118. Because the inferior end 142 of the hood 130 extends into the interior volume 118, the chute discharge mouth 148 is disposed within the interior volume 118, interiorly of the doorway 120. As best seen in FIG. 5B, this allows kitty litter 132 poured onto the curved ramp portion 144 between the sidewalls 146 from outside of the enclosure 106 to flow along the curved ramp portion 144 into the interior volume 118 and through the chute discharge mouth 148 to fall into the litter pan 102.

The hood 130 may be provided with one or more hood retainer elements adapted to engage a corresponding enclosure retaining element on the enclosure to selectively releasably retain the hood 130 in the canopy position. Referring again to FIG. 6, in the illustrated embodiment two catches 150 are disposed on the hood 130 adjacent the superior end 140 of the hood 130. The catches 150 are adapted to engage a corresponding lip 152 (see FIGS. 2A and 2B and 5A and 5B) on the enclosure 106 with a friction fit. A recessed finger grip 136 may be provided between the catches 150 to assist in disengaging the catches from the lip 152. This arrangement is merely one illustrative example and is not intended to be limiting; other arrangements may be used to selectively releasably retain the hood in the canopy position, including, by way of example and not limitation, one or more magnets or movable latches.

The hood 130 may also be provided with one or more stops to limit movement of the hood relative to the enclosure and thereby define the chute position. As noted above, in the illustrated embodiment the hood 130 is pivotably coupled to the enclosure 106. Continuing to refer to FIG. 6, in the illustrated embodiment two pivot posts 154 extend laterally outwardly from the sidewalls 146 near the inferior end 142 of the hood 130. These pivot posts 154 may be received in corresponding pivot apertures 156 formed in the jamb edges 158 of the doorway 120, as best seen in FIGS. 4A and 4B. The sidewalls 146 jog outwardly adjacent the pivot posts 154 to define two opposed laterally projecting shoulders which act as stops 160 for the hood 130. These laterally projecting stops 160 are disposed on the hood 130 adjacent the inferior end 142 thereof. Each stop 160 is adapted to engage a corresponding jamb edge 158 of the doorway 120 to limit movement of the hood 130 relative to the enclosure 106 and thereby define the chute position. This is merely one illustrative implementation of stops and other arrangements are also contemplated.

Preferably, the litter pan 102, enclosure 106 and the hood 130 are each of monolithic construction, for example from a suitable polymer material; the litter pan 102, enclosure 106 and the hood 130 may be made from the same material or from different materials. Also, in some embodiments, the hood is modular and releasably interengageable with the enclosure. In one such embodiment, the hood and enclosure may each be provided in multiple colors and a purchaser can select the color of each of the enclosure and the hood, such as matched colors or complementary colors. For example, where the hood 130 is made from a material (e.g. a suitable polymer) with sufficient flexibility and resilience, the hood 130 may be installed or removed by flexing the hood 130 to fit the pivot posts 154 into, or release the pivot posts 154 from, the pivot apertures 156.

It is also contemplated that a hood of the type described herein may be retrofit onto a doorway of an existing enclosed litter box. For example, a kit may provide a hood 130 of the type shown in FIG. 6 together with hinge fittings adapted to receive the pivot posts 154 and to be secured to the jamb edges of the doorway, for example by way of clips, adhesives, screws, or the like.

Certain illustrative embodiments have been described by way of example. It will be apparent to persons skilled in the art that a number of variations and modifications can be made without departing from the scope of the claims.

The following list of reference numerals is provided for ease of reference, and without limitation:
100 Litter box
102 Litter pan
104 Litter box cover
106 Enclosure
108 Clips
110 Curved sidewall (litter box cover)
112 Curved sidewall (litter pan)
114 Receptacle for waste removal tray
116 Waste removal tray
118 Interior volume of enclosure
120 Feline transit doorway
122 Recess in litter pan
124 Avery the calico cat
130 Hood
132 Kitty litter
134 Refill scoop
136 Recessed finger grip
140 Superior end of hood
142 Inferior end of hood
144 Curved ramp portion of hood
146 Sidewalls of hood
148 Discharge mouth
150 Catches on hood
152 Lip on enclosure
154 Pivot posts on hood
156 Pivot apertures
158 Jamb edges of doorway
160 Stops on hood

What is claimed is:

1. A litter box cover, comprising:
an enclosure adapted to engage and cover a litter pan;
the enclosure defining an interior volume adapted to accommodate *felis catus* defecation;
the enclosure having a feline transit doorway opening into the interior volume, the feline transit doorway adapted to accommodate *felis catus* ingress into and egress from the interior volume;
a hood movably coupled to the enclosure in registration with the doorway so as to be movable between:
a canopy position in which the hood extends outwardly from the enclosure to form a canopy over the doorway; and
a chute position in which the hood forms a guide ramp for guiding particulate material through the doorway into the interior volume.

2. A litter box, comprising;
a litter box cover according to claim 1; and
a litter pan;
wherein the litter box cover is engaged with and covers the litter pan to form the litter box.

3. The litter box of claim 2, wherein the litter box is a self-cleaning litter box.

4. The litter box cover according to claim 1, wherein the hood includes sidewalls.

5. The litter box cover according to claim 1, wherein the hood is curved such that:
when the hood is in the canopy position, the canopy formed by the hood is generally convex; and
when the hood is in the chute position, the guide ramp formed by the hood is generally concave.

6. The litter box cover according to claim 1, wherein the enclosure and the hood are each of monolithic construction.

7. The litter box cover according to claim 1, wherein the enclosure includes a receptacle adapted to receive a waste removal tray for removing waste.

8. The litter box cover according to claim 1, wherein the hood is modular and releasably interengageable with the enclosure.

9. The litter box cover according to claim 1, wherein:
the hood has a superior end and an inferior end, relative to the doorway;
when the hood is in the canopy position, the superior end overlies the enclosure; and
when the hood is in the chute position, the inferior end of the hood extends through the doorway into the interior volume whereby a chute discharge mouth is disposed within the interior volume, interiorly of the doorway.

10. The litter box cover according to claim 9, wherein:
at least one hood retainer element is disposed on the hood adjacent the superior end of the hood and is adapted to engage a corresponding enclosure retaining element on the enclosure to selectively releasably retain the hood in the canopy position; and
at least one laterally projecting stop is disposed on the hood adjacent the inferior end of the hood and is adapted to engage at least one corresponding jamb edge of the doorway to limit movement of the hood relative to the enclosure and thereby define the chute position.

11. The litter box cover according to claim 10, wherein:
the hood includes sidewalls;
the at least one laterally projecting stop comprises two opposed stops each formed by one of the sidewalls.

12. The litter box cover according to claim 1, wherein the hood is pivotably coupled to the enclosure.

* * * * *